US012495949B2

(12) United States Patent
Chai

(10) Patent No.: US 12,495,949 B2
(45) Date of Patent: Dec. 16, 2025

(54) DISHWASHER

(71) Applicant: Fisher & Paykel Appliances Limited, Auckland (NZ)

(72) Inventor: Biao Chai, Dunedin (NZ)

(73) Assignee: Fisher & Paykel Appliances Limited (NZ)

( * ) Notice: Subject to any disclaimer, the term of this patent is extended or adjusted under 35 U.S.C. 154(b) by 364 days.

(21) Appl. No.: 18/012,324

(22) PCT Filed: Jun. 30, 2021

(86) PCT No.: PCT/NZ2021/050101
§ 371 (c)(1),
(2) Date: Dec. 22, 2022

(87) PCT Pub. No.: WO2022/005307
PCT Pub. Date: Jan. 6, 2022

(65) Prior Publication Data
US 2023/0248205 A1 Aug. 10, 2023

(30) Foreign Application Priority Data

Jun. 30, 2020 (NZ) ........................................ 765847

(51) Int. Cl.
*A47L 15/00* (2006.01)
*A47L 15/44* (2006.01)
*F16L 11/11* (2006.01)

(52) U.S. Cl.
CPC ....... *A47L 15/4409* (2013.01); *A47L 15/0084* (2013.01); *A47L 15/0086* (2013.01); *F16L 11/11* (2013.01); *F16L 11/111* (2013.01)

(58) Field of Classification Search
None
See application file for complete search history.

(56) References Cited

U.S. PATENT DOCUMENTS

2020/0196830 A1  6/2020  Dirnberger et al.

FOREIGN PATENT DOCUMENTS

| CN | 101744597 B | 12/2011 |
| DE | 102014115510 A1 | 4/2016 |
| EP | 1435821 B1 | 12/2008 |
| EP | 2982288 A1 | 2/2016 |
| EP | 3173004 A1 | 5/2017 |
| EP | 3289950 A1 | 10/2020 |
| JP | 2006061450 A | 3/2006 |
| KR | 20060010364 A | 2/2006 |
| WO | 93/12706 A | 7/1993 |
| WO | 98/33426 A | 8/1998 |
| WO | 2014/102334 A2 | 7/2014 |

*Primary Examiner* — Levon J Shahinian
(74) *Attorney, Agent, or Firm* — Clark Hill PLC; James R. Foley

(57) ABSTRACT

A dishwasher comprises an internal reservoir for rinse-aid or other wash or rinse additive, a door associated with a refill port to the rinse-aid reservoir, and a flexible conduit between the refill port and the rinse-aid reservoir. The door associated with the refill port to the rinse-aid reservoir may also carry or enable access to a detergent compartment.

21 Claims, 13 Drawing Sheets

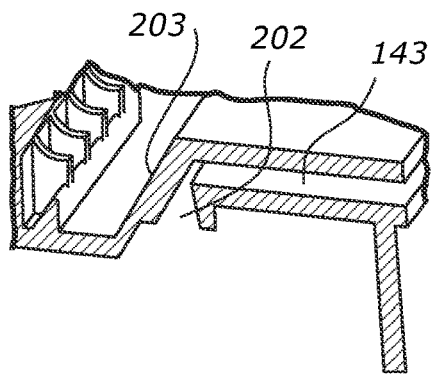
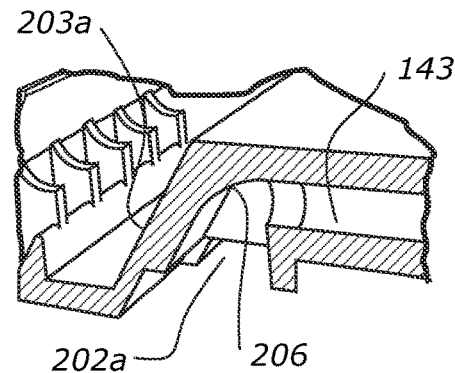
*FIG. 17a*     *FIG. 17b*
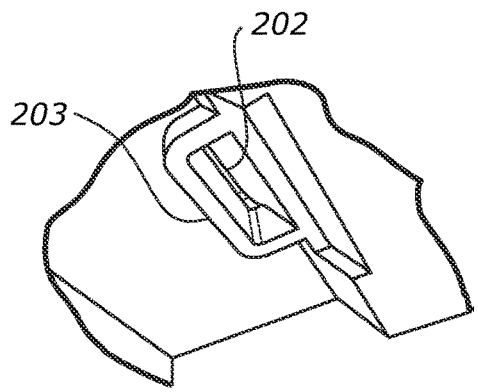
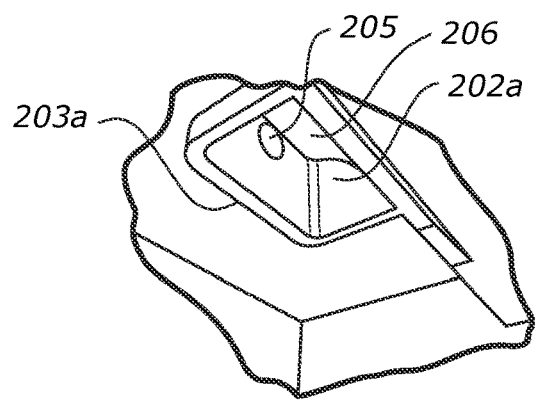
*FIG. 18a*     *FIG. 18b*
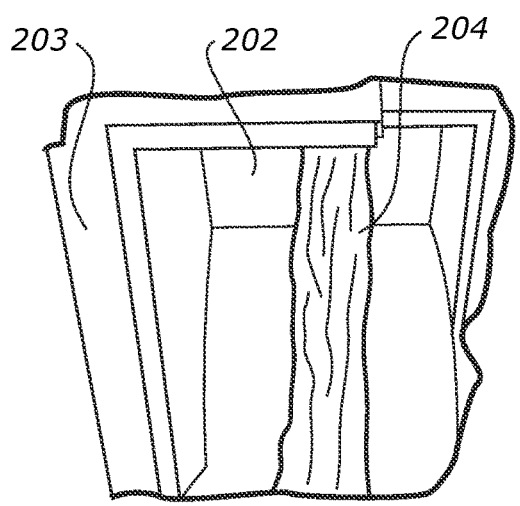
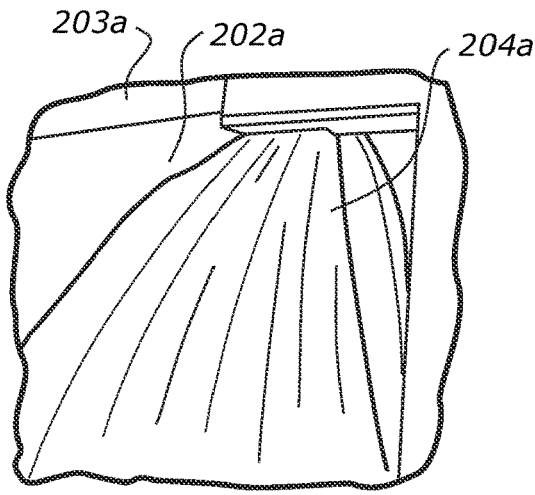
*FIG. 19a*     *FIG. 19b*

DISHWASHER

This application is a National Phase Filing of PCT/NZ2021/050101, having an International filing date of Jun. 30, 2021, which claims priority of New Zealand Patent Application No. 765847, filed Jun. 30, 2020. The disclosure of the foregoing are hereby incorporated by reference.

TECHNICAL FIELD

The invention relates to dishwashers, and more particularly to a dishwasher comprising a relatively easy to fill wash- or rinse-additive reservoir such as, for example, a rinse-aid and/or detergent reservoir.

BACKGROUND ART

A dishwasher commonly comprises a rinse-aid dispenser including a rinse-aid reservoir, from which rinse-aid (usually a liquid) is metered into the wash space during the rinsing part of the wash cycle of the dishwasher. The rinse-aid reservoir is periodically refilled with rinse-aid by the user, after multiple wash cycles, typically through an access port normally covered by a small door on the inside wall of the door of a front drop-door-type dishwasher, or by a screw cap on the front inside wall of a drawer-type dishwasher (for example, our DishDrawer™ drawer-type dishwasher). Refilling the rinse-aid reservoir typically requires the user to pour liquid rinse aid from a bottle ideally without spillage, into the access port in the dishwasher inside wall or door.

EP2982288A1 discloses a dishwasher in which the dispensing opening of a detergent compartment is coupled to a detergent outlet by a flexible conduit, an inlet of the conduit may be moved between a first position where it can receive detergent from the dispensing opening and a second position, away from the dispensing opening.

It is an object of the present invention to provide a dishwasher with improved ergonomics in relation to refilling of a wash or rinse additive reservoir, such as a rinse-aid or detergent reservoir, or to at least provide a useful alternative wash or rinse additive refilling arrangement.

SUMMARY OF INVENTION

In a first aspect, the invention broadly consists in a dishwasher, or an additive dispensing module for a dishwasher, comprising:
an additive reservoir,
a door associated with a refill port to the additive reservoir, and
a flexible conduit between the refill port and the additive reservoir through which additive may be supplied to the additive reservoir.

In at least some embodiments the flexible conduit is a resiliently-compressible conduit. For example at least a part of the flexible conduit may comprise a concertina structure.

In at least some embodiments the additive reservoir is a rinse-aid reservoir. In at least some embodiments the additive reservoir is a rinse-aid reservoir and the door associated with a refill port to the rinse-aid reservoir is also a door of a detergent compartment of the dishwasher. In at least some embodiments the refill port to the rinse-aid reservoir is carried by the door, and the door may also mount a closure cap to the refill port to the rinse-aid reservoir. In such embodiments, closing of the door may also close the closure cap to the refill port to the rinse-aid reservoir. In at least some embodiments the door carries a detergent bucket.

In a second aspect, the invention broadly consists in a dishwasher, or an additive dispensing module for a dishwasher, comprising:
a detergent compartment,
a door to the detergent compartment,
a rinse aid reservoir,
a refill port to the rinse-aid reservoir, the refill port carried by the door to the detergent compartment,
a closure cap to the refill port to the rinse-aid reservoir, the rinse-aid closure cap associated with the door to the detergent compartment, and
a resiliently flexible and/or compressible conduit between the rinse-aid refill port and the rinse-aid reservoir.

In this specification:
"comprising" means "consisting at least in part of". When interpreting a statement in this specification and claims that includes "comprising", features other than that or those prefaced by the term may also be present. Related terms such as "comprise" and "comprises" are to be interpreted similarly.
"additive" and "wash or rinse additive" include rinse-aid, detergent, and water softener, in flowable form, either liquid or particulate form.

BRIEF DESCRIPTION OF DRAWINGS

Embodiments of the invention will now be described with reference to the accompanying drawings by way of example, in which:

FIG. 18A and 18B are similar perspective views into the prior art and improved spray or jet-forming hoods of FIGS. 17A and 17B from below, and FIGS. 19A and 19B are views into the prior art and improved spray- or jet-forming hoods of FIGS. 17A and 18A and 17B and 18B from the front of the detergent and rinse-aid module showing the sprays or jets which are formed thereby.

DESCRIPTION OF EMBODIMENTS

Dishwasher Overview

Figure 1:
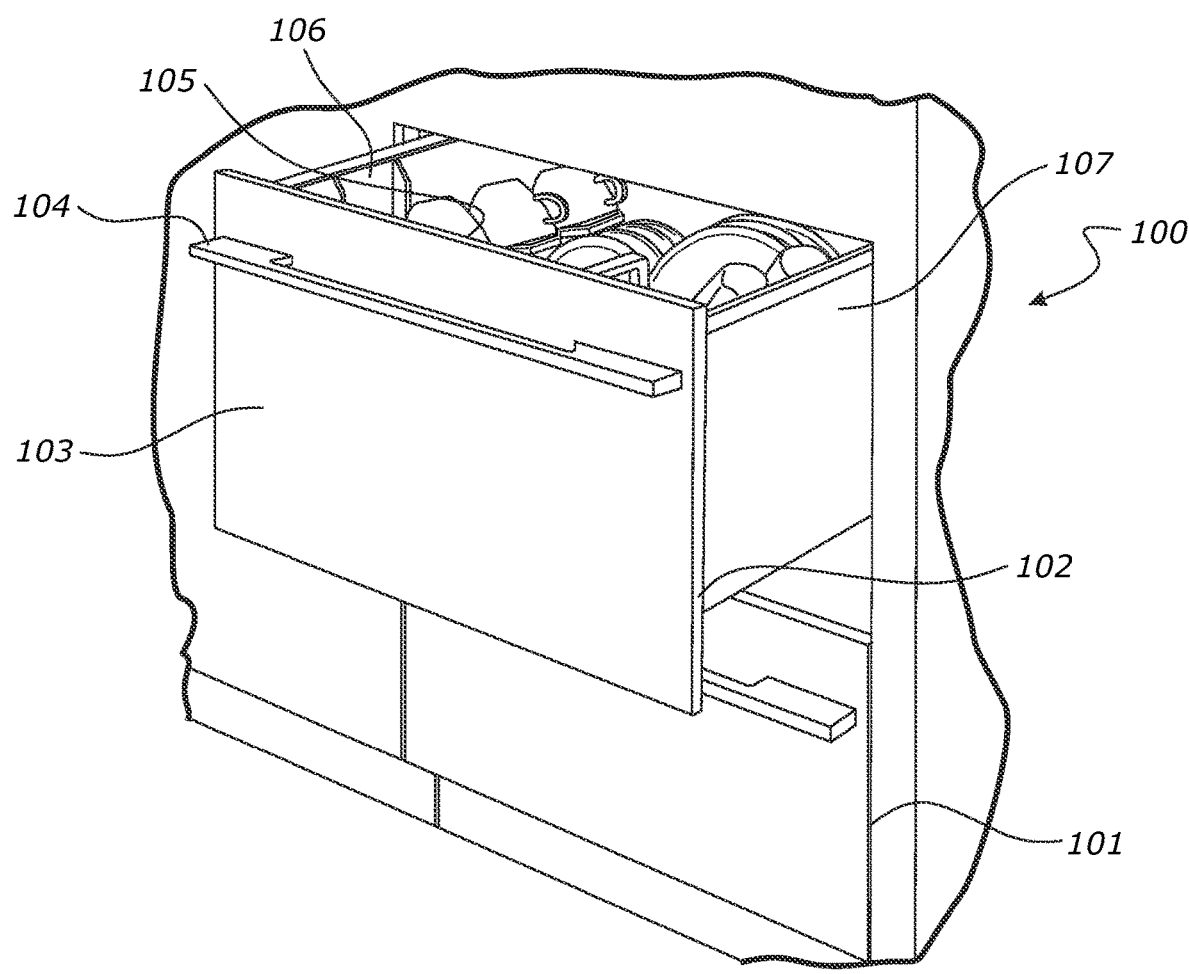
FIG. 1 is a perspective view from the front of a double drawer-type dishwasher.

FIG. 1 shows as an exemplary washing appliance, a dishwasher 100 of the drawer-type or drawer-style such as our DishDrawer™ dishwasher (see for example our prior patent publications WO9323706A and WO9833426A, the entire content of which is incorporated by reference herein) installed in kitchen cabinetry. The double drawer dishwasher shown has a lower drawer 101 closed and an upper drawer 102 open.

As is known, each dishwasher drawer is slidably mounted within an outer cabinet and chassis in a drawer-style arrangement, and comprises, in the case of upper drawer 102, a front panel 103 which may have a handle 104, internal front wall 105 behind the front panel 103, left and right side walls 106 and 107, and an end wall and base (not shown). The internal walls and base define a wash chamber or wash space or washing tub having an open top, within the/each wash drawer. In use the wash drawer is withdrawn from the external cabinet to an open position for loading and unloading dishes and/or cutlery, and when loaded or empty is pushed home into the cabinet to close the drawer, and enable washing to occur when loaded. When the wash drawer is home in the cabinet the open top of the drawer is closed by an internal lid that may move vertically once the drawer is closed.

Each drawer comprises an associated wash system including a wash water inlet valve, a wash pump that draws in washing liquid such as a water and detergent mixture from the wash space, a rotatable spray arm which in operation directs washing liquid from the wash pump onto items in the wash space, a drain pump (preferably integrated with the wash pump) for directing soiled washing liquid to a drain, a heater, and a wash liquid filtration system. Washing cycles are initiated via a control unit in response to input via a user interface panel.

A drawer-type dishwasher is referred to by way of example only, and a dishwasher incorporating a wash or rinse additive reservoir refill arrangement of the invention such as a rinse-aid reservoir may equally be of the common type comprising a front drop—door, pivotally mounted about its lower edge for example, an in-sink dishwasher, "table-top" dishwasher, or any other type.

Combined Detergent and Rinse-Aid Refill Door

Figure 2:
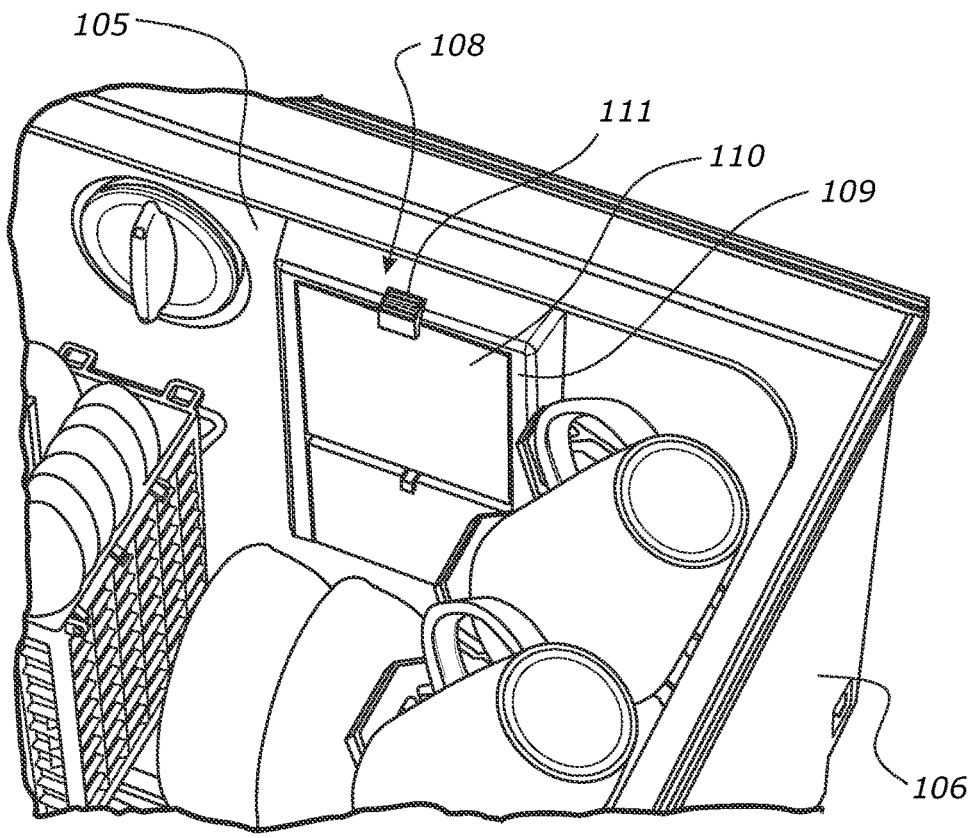
FIG. 2 is a perspective view from above (and from the rear of the dishwasher) of the left side front corner of a wash drawer of the drawer-type dishwasher of FIG. 1 loaded with dishes, withdrawn from the outer cabinet and with the detergent and rinse-aid refill door closed.
Figure 3:
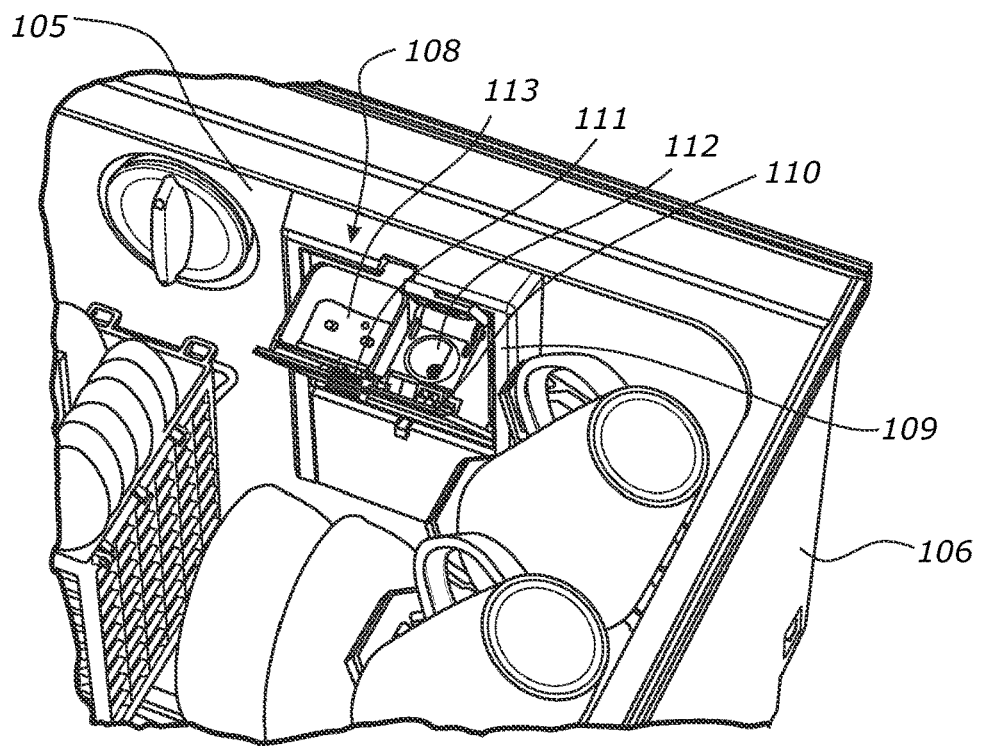
FIG. 3 is a perspective view from above of the left side front corner of a wash drawer of the drawer-type dishwasher of FIG. 1, similar to FIG. 2 but with the detergent and rinse-aid refill door open to show the rinse-aid refill port carried by the door.
Figure 4:
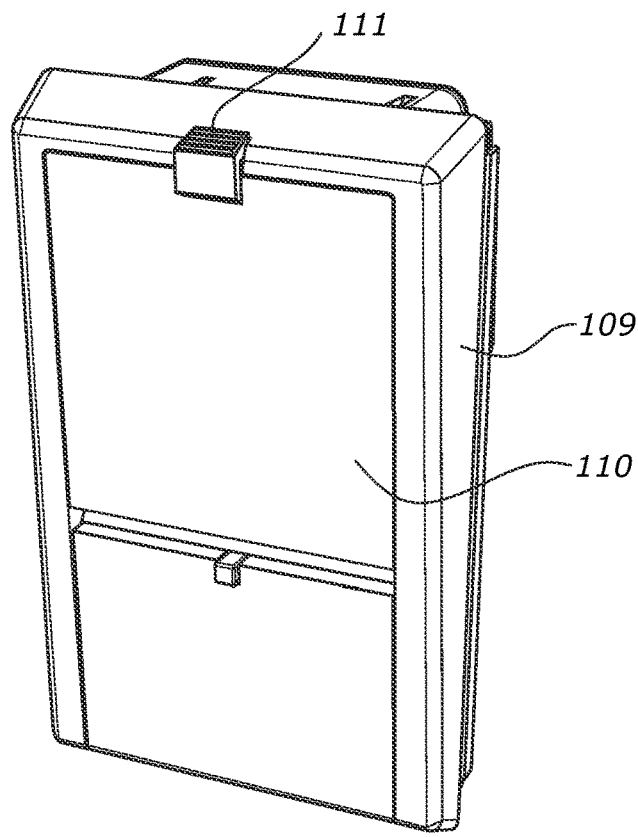
FIG. 4 is a perspective view from the front side (that is, from the rear of the dishwasher), of a detergent and rinse-aid module, with the detergent and rinse-aid refill door closed.

FIGS. 2 and 3 are perspective views from above (and from the rear of the dishwasher) of the left side front corner of a wash drawer (when viewed from the front) of the drawer-type dishwasher of FIG. 1, withdrawn from the outer cabinet, and loaded with dishes, comprising a wash or rinse additive reservoir refill arrangement of an embodiment of the invention. The dishwasher comprises a combined detergent and rinse-aid refill door 110 in the internal front wall 105 of the wash drawer. In FIG. 2 the door 110 is shown closed and in FIG. 3 the door 110 is shown open. In the embodiment shown the door 110 pivots about its lower edge, and moves as indicated by arrow A in FIG. 6, between an open position shown in FIGS. 3, 5, and 6 and a closed position shown in FIGS. 2 and 4.

When pushed closed by a user, the detergent and rinse-aid refill door 110 is held closed by a closure or fastener that may be a snap latch or clip or button latch which may be in any form, such as a living hinge, but is shown in the figures as a plastics snap latch 111 between the top of the door 110 and the adjacent dishwasher wall 105. In fact, in the embodiment shown the latch 111 operates between the door 110 and a surrounding frame 109, which may also be formed of a plastics material, of a detergent and rinse-aid module (also referred to simply as a "dispenser") generally indicated at 108 and shown separately in FIGS. 4 to 6. Latch 111 may be movable in a slot in door 110, so that when the door is closed the latch may slide in the plane of the door to clip against the surrounding frame, biased upwardly by a spring (not shown).

A lower panel 125 may be integrally-formed with the frame 109 of module 108 or may be a removable cosmetic panel attachable to module 108. Panel 125 forms a front surface of module 108 which is substantially coplanar with door 110 when in its closed position (see FIG. 4). A wash or wash or rinse-aid additive refill indicator 126 is shown in, or extending through, an upper region of panel 125 and may be the end of a light pipe channeling light from a light source which is effected by the level of rinse or wash additive in the reservoir such that when the level in the reservoir drops below a predetermined level, light from the source passes to and illuminates indicator 126.

Because the detergent and rinse-aid module 108 is formed as a separate unit this enables it or most of its parts to be moulded from a plastics material for example, and mounted to the front wall 105 of the dishwasher drawer (preferably with a seal compressed therebetween) which may therefore be formed from a different material such as for example stainless steel. Alternatively however, where the dishwasher drawer is also moulded from a plastics material the detergent and rinse-aid refill door 110 may mount directly in the plastics front wall 105 of the wash drawer, with or without surrounding frame 109.

A detergent compartment comprising a bucket 113 is carried on the rear side of the door 110 which, when the door 110 is opened as shown in FIG. 3, can be charged with particulate or liquid detergent before each operating cycle of the dishwasher. Alternatively the detergent compartment 113 may be provided in or behind the front inside wall 105 of the dishwasher instead of by way of the bucket 113 on the rear of the door 110, or in or behind the inside wall of the door of a front drop-door-type dishwasher, in which case opening the door 110 or equivalent will expose a bucket, or a refill port to a detergent bucket, behind the door, or will expose a reservoir which may be filled with sufficient detergent for multiple wash cycles/loads of the dishwasher.

Rinse-Aid Refill Port on Detergent Door

The dishwasher also comprises a rinse-aid dispenser including a reservoir, from which liquid rinse-aid may be metered into the wash space during the rinsing part of each wash cycle following the washing phase of the cycle, and in accordance with this aspect of the invention a rinse-aid refill port 112 is also carried by the door 110. In the embodiment shown the rinse-aid refill port 112 is also carried on the rear side of the door 110.

Figure 9:
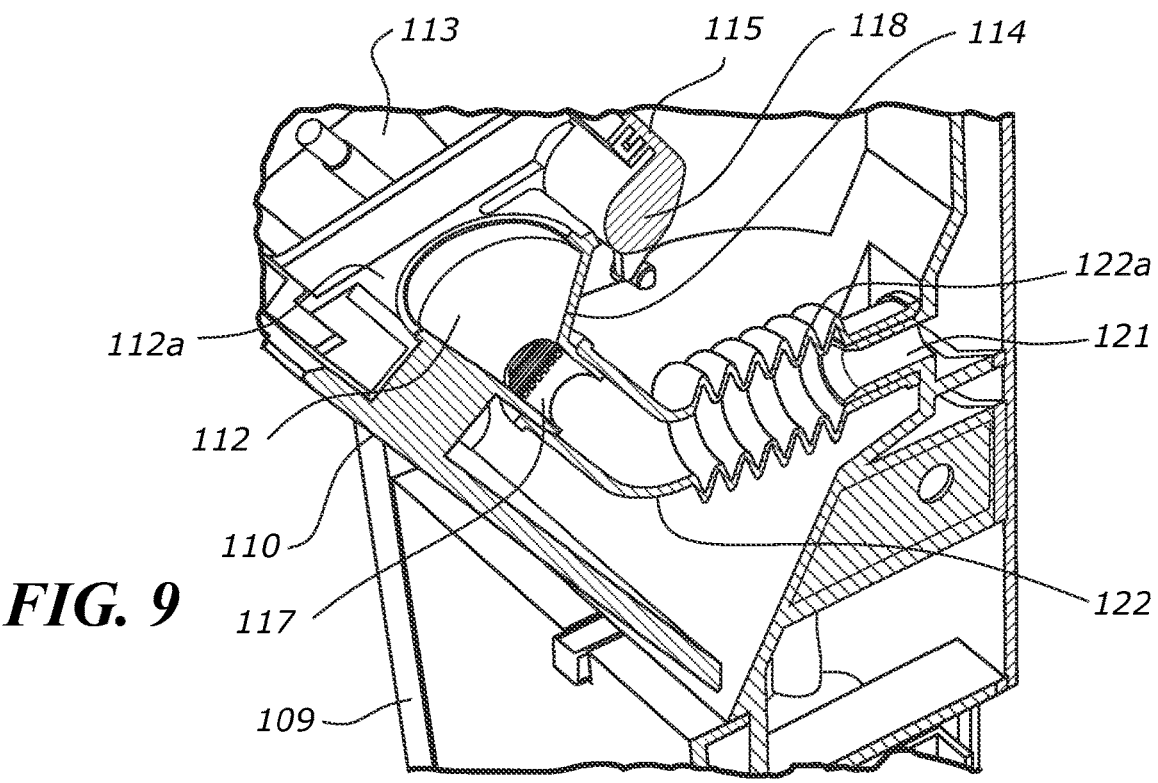
FIG. 9 is an enlarged cross-sectional view of part of the detergent and rinse-aid module of FIGS. 4 to 8, through the rinse-aid refill port and rinse aid cap with the detergent and rinse-aid refill door open and the rinse-aid cap open.

A plastics frame part 112a on the rear of the door 110, and optimally moulded integrally with the door 110, comprises an integral funnel part 114—see in particular FIG. 9. The funnel opening defines the rinse-aid refill port 112. When the door 110 is opened, rinse-aid can be poured into the funnel 114, which leads to a rinse-aid reservoir as is further described below. A mesh (visible in FIG. 9) may be provided across the rinse-aid refill port, below the level of the opening of funnel 114, to allow liquid rinse-aid to pass through the port but to substantially block granular materials such as detergents, accidentally poured into the rinse-aid refill port.

Thus the door 110 which carries the detergent bucket 113 is also the door to the refill port to the rinse-aid reservoir, and in the embodiment shown the one door 110 carries both the detergent bucket 113 (or could open a detergent compartment in some other form) and the rinse-aid refill port 112.

Rinse-Aid Refill Closure Cap

Figure 5:
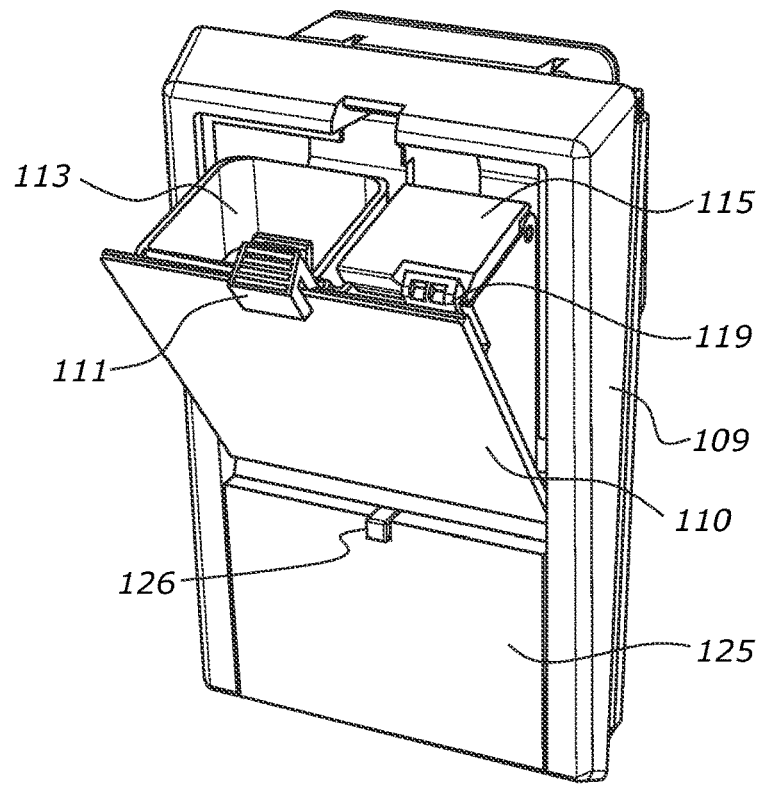
FIG. 5 is a perspective view from the front side of the detergent and rinse-aid module of FIG. 4, with the detergent and rinse-aid refill door open and a rinse-aid cap closed over the rinse-aid refill port.

Also in the embodiment shown, the detergent and rinse-aid refill door 110 carries a closure cap 115 for the rinse-aid refill port 112. The rinse-aid closure cap 115 is pivotally mounted to an edge of plastics frame part 112a furthest from door 110 for movement as indicated by arrow B in FIG. 6, between an open position shown in FIGS. 3 and 6 and a closed position as shown in FIG. 5. A small seal 116 is carried on the underside of the rinse-aid closure cap 115 which seals against the rim of the rinse-aid refill port 112 when rinse-aid closure cap 115 and/or detergent and rinse-aid refill door 110 is closed.

In the embodiment shown the rinse-aid closure cap 115 is mounted, by a plastics pivot or hinge 118, to the door 110 and in particular to an opposite edge of the top of the frame 112a defining the rinse-aid refill port 112 as shown. Also, when pushed closed the rinse-aid closure cap 115 is held closed by a closure or fastener such as a snap latch which may be in any form but is shown in the figures as snap plastics latch or clip 119 between the edge of the rinse-aid closure cap 115 opposite pivot 118 and the door 110. The pivot 118 has an associated small spring 118a (see FIG. 10C) which biases the rinse-aid closure cap 115 towards its open position so that when unlatched, by a user pressing snap latch 119, it will gently spring open. Snap latch 119 may be offset to one side of the axis of refill port 112 (as shown in the drawing figures), or it may be positioned centrally along the front edge of closure cap 115, adjacent door 10.

Flexible Conduit Between Rinse-Aid Refill Port & Reservoir

Figure 6:
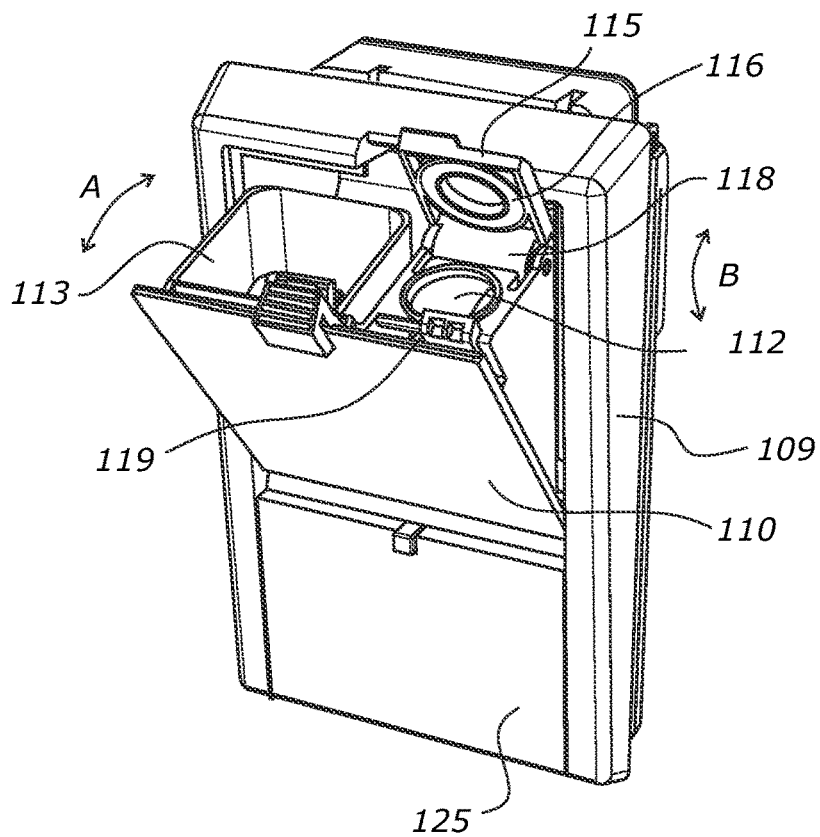
FIG. 6 is a perspective view from the front side of the detergent and rinse-aid module of FIGS. 4 and 5, with the detergent and rinse-aid refill door open and the rinse-aid cap open.
Figure 7:
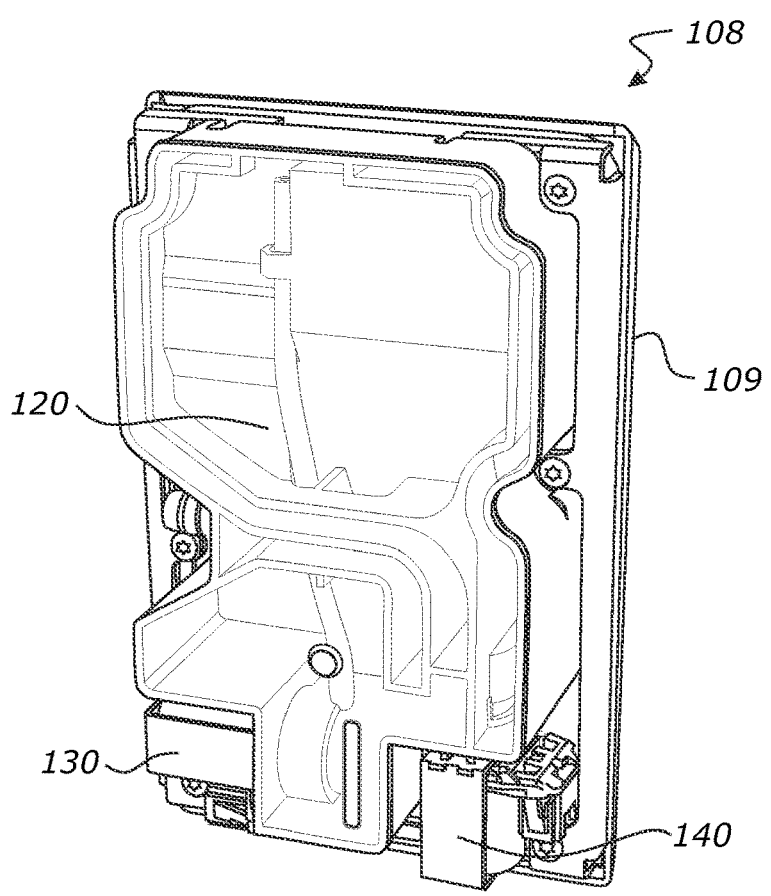
FIG. 7 is a perspective view of the rear side of the detergent and rinse-aid module of FIGS. 4 to 6.

FIG. 7 is a perspective view of the rear side (that is, viewed from the front of the dishwasher) of the detergent and rinse-aid module 108 of FIGS. 4 to 6, FIG. 8 is an exploded view of the detergent and rinse-aid module, and FIG. 9 is an enlarged cross-sectional view of part of the detergent and rinse-aid module.

The detergent and rinse-aid module 108 comprises an integral rinse-aid reservoir 120. The rinse-aid refill port 112, and in particular an outlet end 117 of the funnel part 114, is connected to an entry port 121 to the rinse-aid reservoir 120 by a flexible conduit 122—see especially FIGS. 8 and 9. The flexible conduit 122 in the embodiment shown is a compressible or flexible or bendable or elastic conduit comprising a concertina structure as indicated at 122a. The concertina structure enables the length of the conduit to be changed by pressing the ridges together or flattening them out thus enabling conduit 122 to have some compressibility/flexibility/elasticity, at least along the length/axis of the conduit, and so adapt to different positions of door 10, even if it is not manufactured from a material that is itself particularly inherently compressible/flexible/elastic. Preferably the conduit has some resilience so that when it is compressed or flexed or bent or stretched, it has a natural tendency to return to, or towards, its original form.

Thus, conduit 122 could be formed from a material that is inherently relatively inflexible, such as polyethylene or polypropylene hosing or tubing, but have a wall thickness or concertina structure or other structure that results in the conduit being able to bend or flex or compress or stretch or twist so that the conduit itself has a sufficiently high level of flexibility. Ideally however, conduit 122 is formed of a resiliently compressible, elastic or flexible material such as a silicone or rubber or plastics material for example, with or without a structural design that enhances the material's inherent flexibility.

In an alternative embodiment, flexible conduit 122 may comprise another form of flexible or resiliently compressible or collapsible conduit or simply a bendable silicone or rubber or plastics tube for example, which is bent as the detergent and rinse-aid refill door 110 moves form its open to its closed position (and is internally open to pass rinse-aid from the funnel to the reservoir when the detergent and rinse-aid refill door is open). For example, conduit 122 may comprise a tube or hose formed from a film or thin wall polymeric material such as an elastomer, for example latex rubber (similar to the material that latex rubber gloves are manufactured from). In this case, the material itself has an inherent elasticity thereby providing flexibility (though little resilience to compression) to the overall structure of conduit 122 so that it is able to adapt to the changing distance between the rinse-aid refill port at outlet end 117 and rinse-aid reservoir entry port 121.

Figure 8:
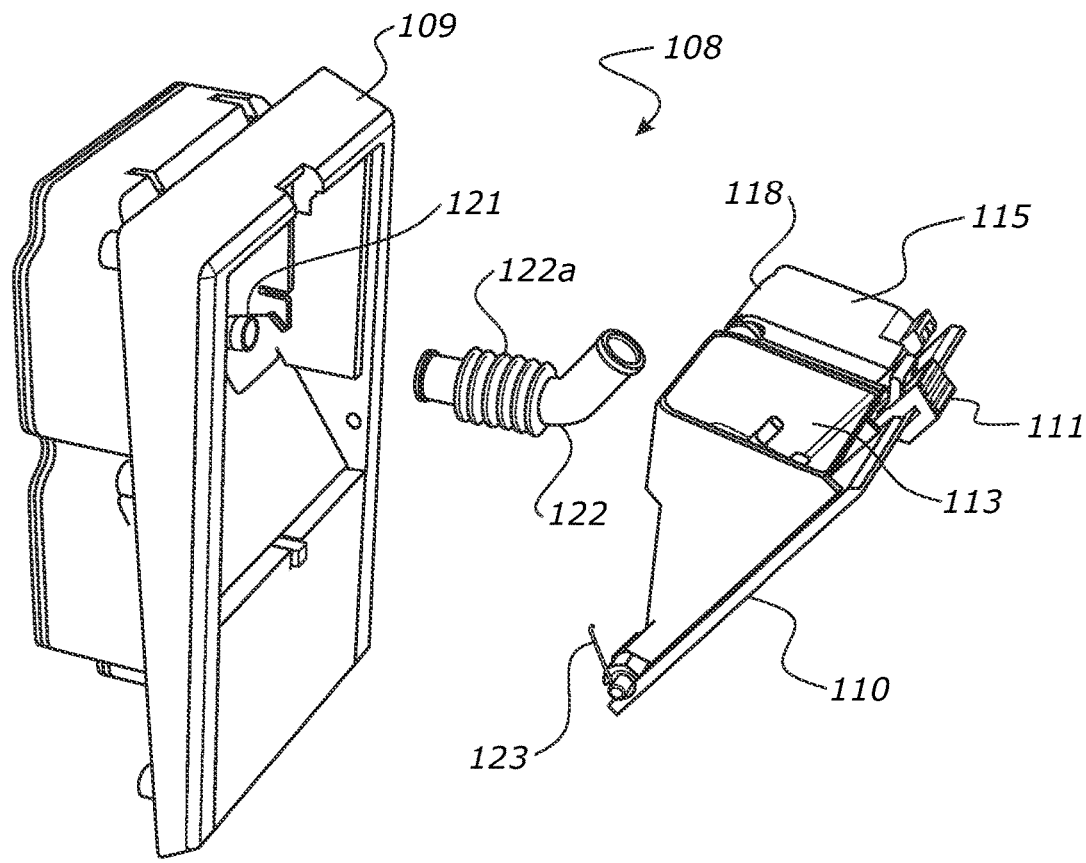
FIG. 8 is an exploded perspective view from the side of the detergent and rinse-aid module of FIGS. 4 to 7.
Figure 10A:
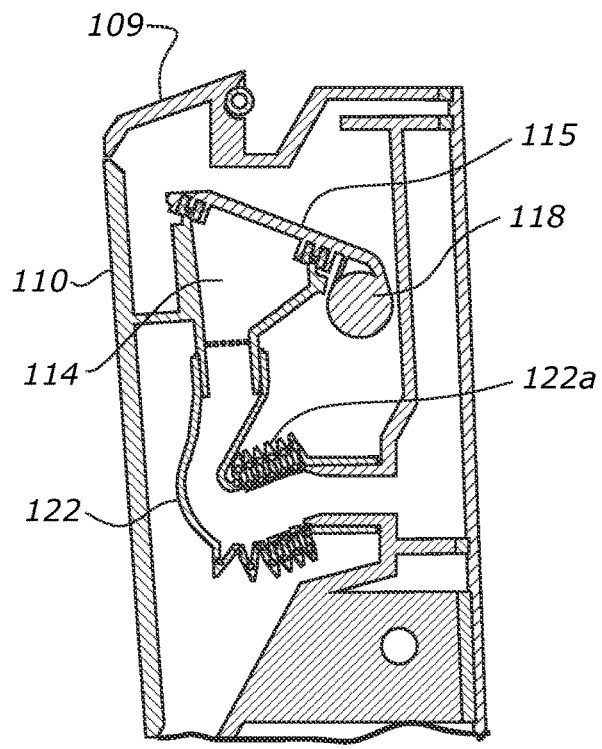
FIGS. 10A-C are cross-sectional enlarged views of the detergent and rinse-aid module of FIGS. 4 to 9, FIG. 10A showing the detergent and rinse-aid refill door and the rinse-aid cap closed and FIGS. 1013 and 10C showing the detergent and rinse-aid refill door open and the rinse-aid cap closed.

In a preferred form closing of the detergent and rinse-aid door is against resilience of the conduit 122, which acts to bias the door towards its open position. In the particular case of the illustrated embodiment, closing of the door 110 compresses the concertina structure 122a of conduit 122 as shown in FIG. 10A. Closing of the door 110 also deforms/bends the conduit 122 (compare the relaxed conduit configuration of FIG. 10B to the bent configuration in FIG. 10A). In FIG. 10A conduit 122 is bent so that the axes of its opposed ends intersect at an angle of around 90° or less, preferably at an acute angle. In contrast, the relaxed/nominal or "at rest" configuration of conduit 122 shown in FIG. 8 shows the axes of the opposed ends intersecting at an obtuse angle between about 120-150°, preferably about 135°. Additionally or alternatively a spring 123, see FIG. 8, shown, for example, at the pivot hinge axis of the door 110, may bias the door 110 towards its open position.

Figure 10B:
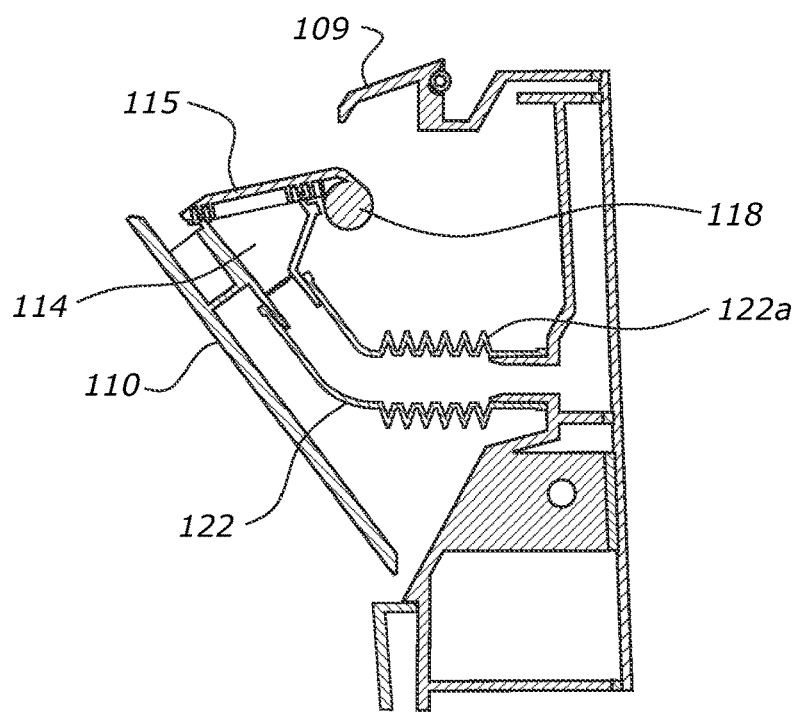
Figure 10C:
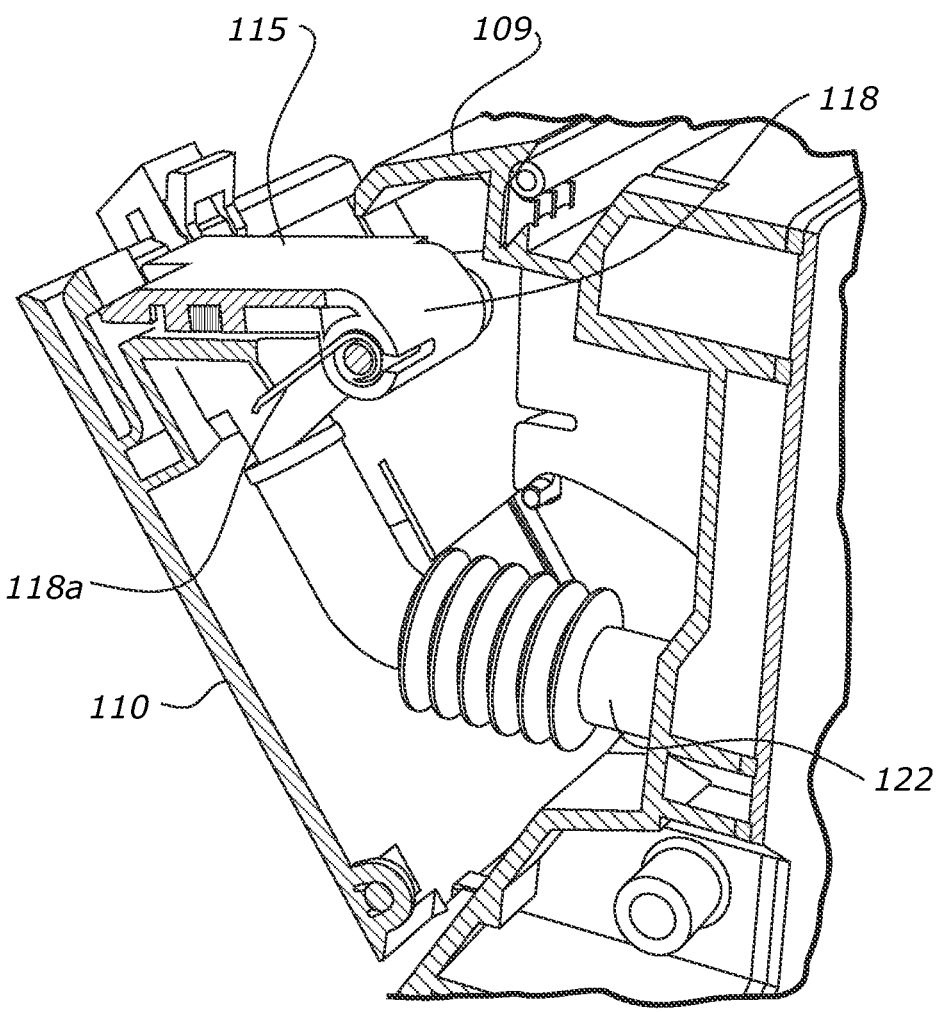

FIGS. 10A-C are cross-sectional views of the detergent and rinse-aid module 108 of FIGS. 4 to 9 showing the detergent and rinse-aid refill door 110 closed. FIG. 10A shows that when the detergent and rinse-aid door is closed the rinse-aid cap is also closed while FIGS. 10B and 10C show that the detergent and rinse-aid refill door is open while the rinse-aid cap is closed.

In the embodiment shown the rinse-aid reservoir 120 is in the rinse-aid module 108 but in an alternative embodiment where the rinse-aid reservoir 120 is not integrated with the detergent and rinse-aid module 108, the rinse-aid reservoir may be a separate, non-integral component within the dishwasher, remotely and/or separately mounted further away from the detergent and rinse-aid refill door 110 carrying the rinse-aid refill port, and fluid-connected to the rinse-aid refill port on the door by a longer conduit.

Self-Closing Rinse-Aid Refill Cap

To fill the detergent bucket 113 the user opens the detergent and rinse-aid refill door 110. This is achieved by unlatching latch 111 (by pushing the latch downwardly, against its biasing spring force) which releases the latch from surrounding frame 109 and allows door 110 to gently spring open under the influence of spring 123 and the biasing force of compressed/bent conduit 122. The user can then push door 110 closed after adding detergent (usually powder). In addition, or alternatively, while the detergent and rinse-aid refill door 110 is open, the user may open the rinse-aid closure cap 115 by unlatching latch 119, to refill rinse-aid reservoir 120. Once the user has poured liquid rinse-aid into funnel 114 to add rinse-aid to the reservoir, the user can push the rinse-aid closure cap 115 closed, by pushing it towards its pivotally closed position until it relatches closed. Alternatively, in the embodiment shown and as explained in further detail below, the user can simply push the detergent and rinse-aid refill door 110 closed, which will also close and relatch the rinse-aid closure cap 115 as the refill door 110 closes.

Figure 13A:
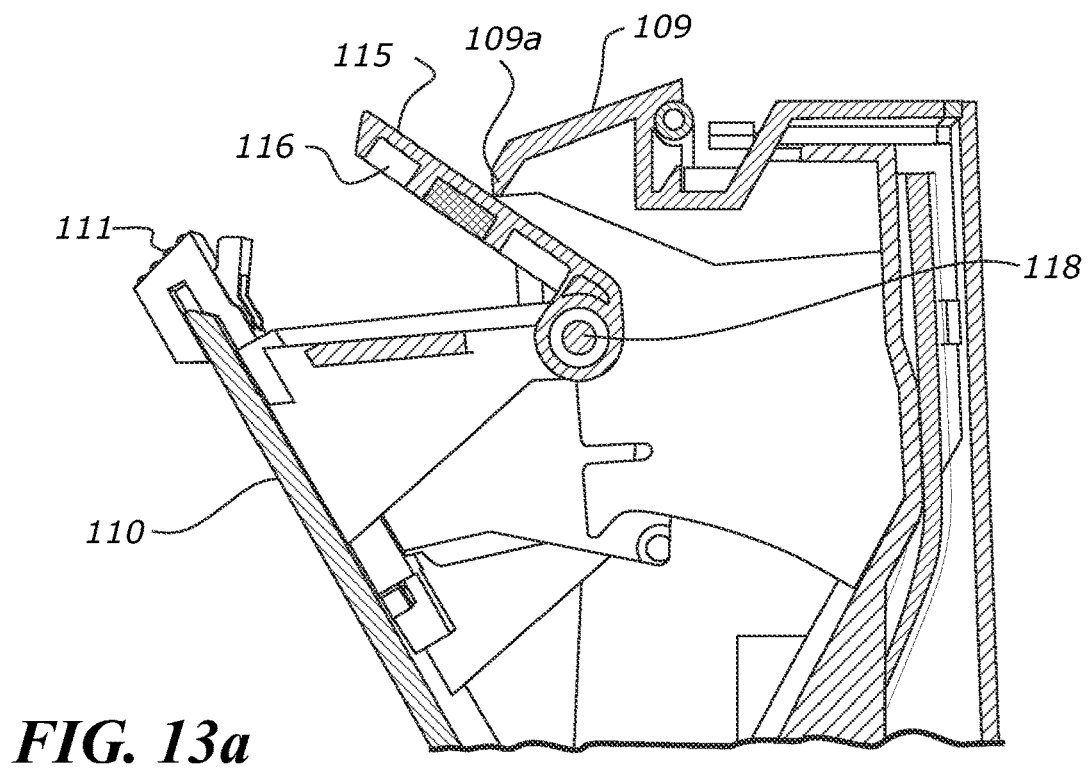
FIGS. 13A-C are a series of enlarged cross-sectional views of a top part of the detergent and rinse-aid module of FIGS. 4 to 12, with the detergent and rinse-aid refill door open and rinse-aid cap in progressively closing stages in FIGS. 13A and 13B and fully closed in FIG. 13C.
Figure 13B:
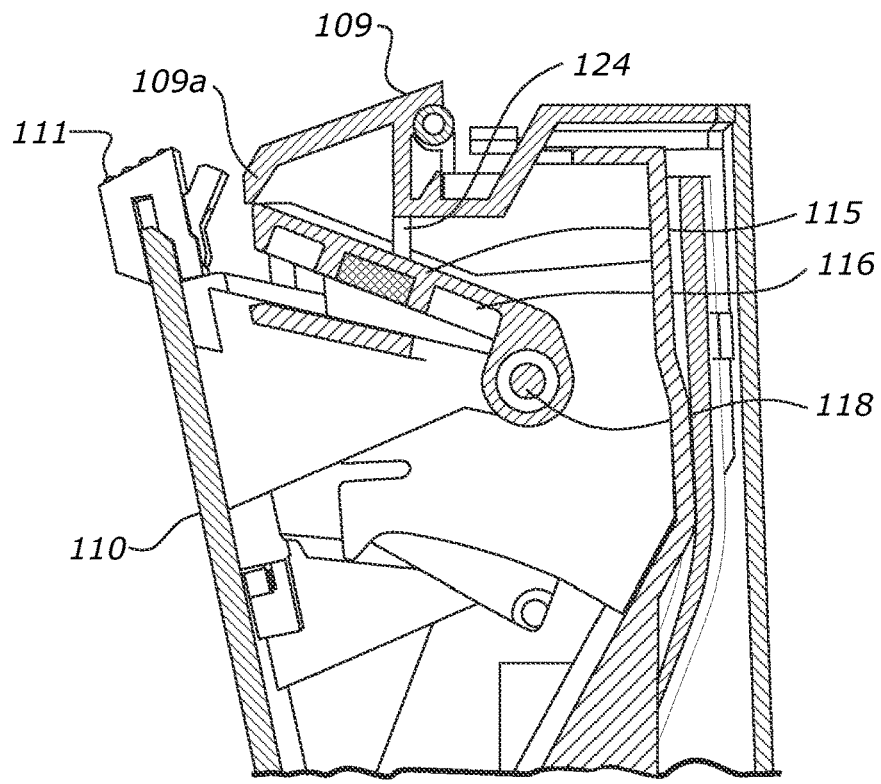
Figure 13C:
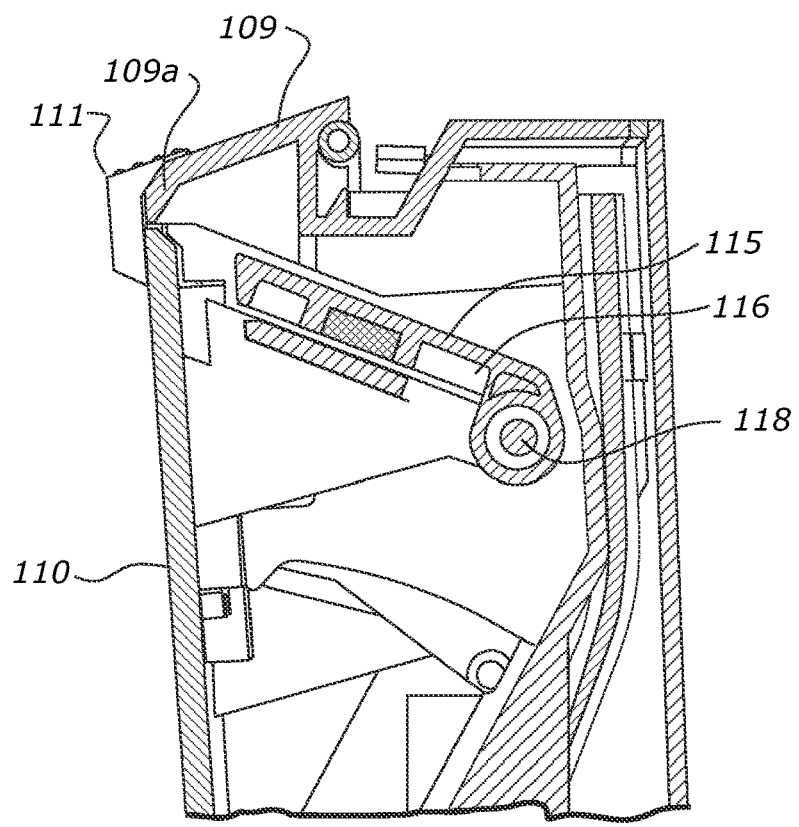

Now referring to FIGS. 13A-C which are enlarged cross-sectional views of the top part of the detergent and rinse-aid module 108 of FIGS. 4 to 12 with the detergent and rinse-aid refill door 110 and rinse-aid closure cap 115 in progressing stages of pivotally closing about axis 118. If door 110 is open and the user has opened but not re-closed the rinse-aid closure cap 115, then as the user pushes the detergent and rinse-aid refill door 110 closed, the top of the rinse-aid closure cap 115 bears against an adjacent part which pushes the rinse-aid closure cap 115 towards its closed position. Rinse-aid closure cap 115 is fully closed and relatched when the detergent and rinse-aid refill door 110 is also fully closed and latched.

FIG. 13A shows the detergent and rinse-aid refill door 110 between its open and closed positions, part-way through closing. A pair of internal guides 124 (see FIG. 12) are provided within a cavity of the detergent and rinse-aid module 108 that is occupied by the rinse-aid refill port when door 110 is closed. During closing of door 110 the upper surface of the rinse-aid closure cap 115 initially bears against a rim or edge 109a of the aperture in module 108 in which the detergent and rinse-aid refill door 110 is mounted. Preferably, the rim or edge 109a is a part of the surrounding frame 109. At this initial stage of closing, internal guides 124 are not in contact with rinse-aid closure cap 115. FIG. 13B shows the detergent and rinse-aid refill door 110 near its closed position. In the embodiment shown, as the door 110 moves from the partly closed position shown in FIG. 13A closer towards its closed position in FIG. 13B, the upper surface of the rinse-aid closure cap 115 bears against the internal guides 124. As the refill door 110 approaches its fully closed position, internal guides 124 push the rinse-aid closure cap 115, pivoting it about its axis 118, fully home into its closed position as shown in FIG. 13C in which latch 119 snaps over the forward edge of cap 115 to hold it closed when door 110 is re-opened.

Cleaning

Figure 11:
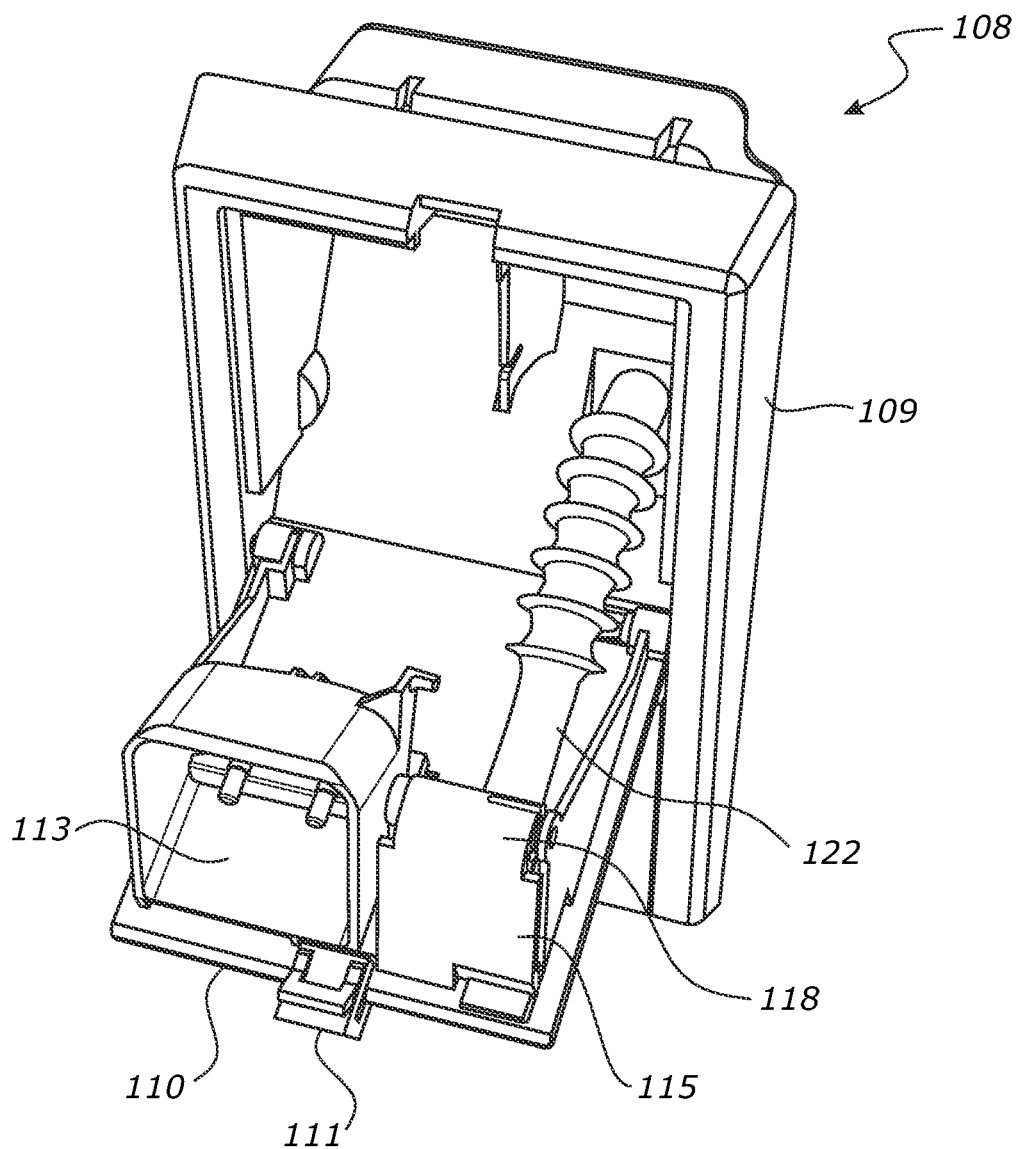
FIG. 11 is a perspective view from the front side of the detergent and rinse-aid module of FIGS. 4 to 10, with the detergent and rinse-aid refill door open to a cleaning position and showing the flexible tube.
Figure 12:
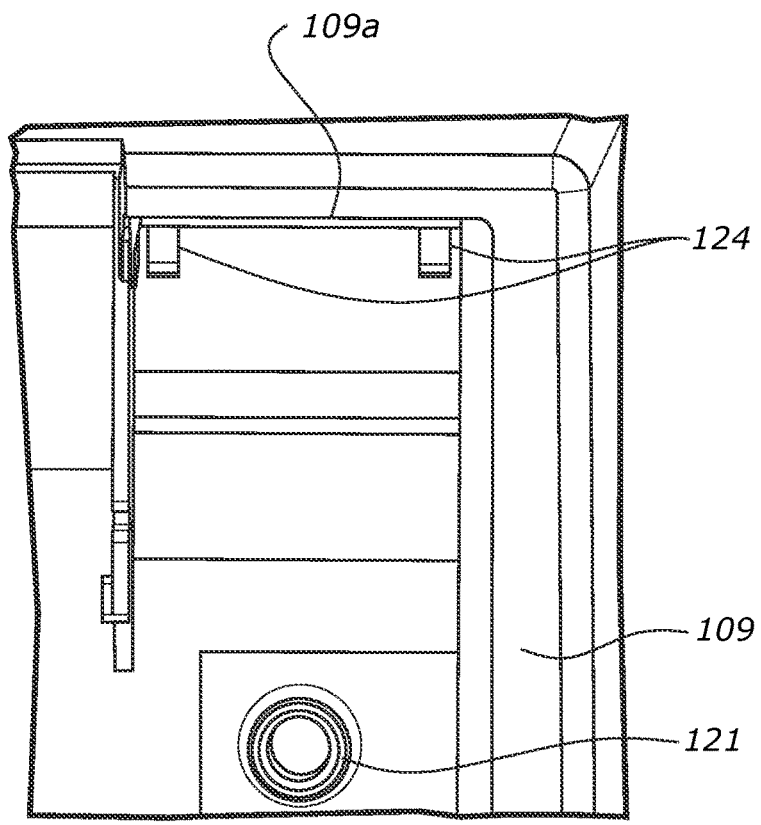
FIG. 12 is an enlarged view from the front side into and of a top corner of the detergent and rinse-aid module of FIG. 11 with the flexible tube removed.

In a preferred embodiment the detergent and rinse-aid refill door 110 can be opened beyond its open, refilling position, to a cleaning position. For example in its refilling position the door may be at about 40-80° from its closed position and in the cleaning position the door is open to a greater extent, such as 100-120°, for example. For the embodiment described this is shown in FIG. 11.

FIGS. 3, 5, and 6 for example show the detergent and rinse-aid refill door 110 in its open position in which detergent and/or rinse-aid can be refilled—in particular the detergent bucket 113 and rinse-aid refill port 112 openings face generally upwardly. The flexible conduit 122 and the hinge structure of door 110 enable the detergent and rinse-aid refill door to also be opened to a greater extent, to a position in which the opening of detergent bucket 113 faces substantially horizontally or slightly downwardly, to enable it to be easily cleaned of undissolved detergent powder for example, by the user.

The hinge structure may have a first stop or detent, to or against which the detergent and rinse-aid refill door 110 is normally moved for refilling, and which defines the open position of door 110. Door 110 can also be opened/pulled with slightly greater force past this first stop, to its cleaning position. Alternatively, the force applied by the user may elastically deflect or deform door 110 so that it may bypass the first stop. The hinge structure may have a second stop or detent in this cleaning position. Moving the detergent and rinse-aid refill door 110 to this cleaning position may elongate/stretch the conduit 110 as shown in FIG. 11, thereby taking advantage of the elasticity of conduit 110.

Further Variations

As stated, the embodiment described with reference to the drawing FIGS. comprises a detergent and rinse-aid module 108 formed separately and mounted to the side wall of the dishwasher. But alternatively, the detergent and rinse-aid refill door, carrying detergent bucket 113 and rinse-aid port 112, may mount directly in the side wall of the dishwasher rather than forming part of a separate detergent and rinse-aid module mounted to/in the side wall.

Also in the embodiment described the detergent and rinse-aid refill door 110 pivots about its lower edge, but alternatively it may comprise a substantially vertically aligned side hinge, for example.

Detergent may be added to the detergent bucket 113 on the rear side of the detergent and rinse-aid refill door 110 or door 110 may expose a detergent bucket and/or rinse-aid refill port 112 associated with the dishwasher side wall, and the rinse-aid closure cap 115 carried (in the described embodiments) by the detergent and rinse-aid refill door 110 may instead be carried by the dishwasher side wall so that the rinse-aid refill port on the door moves against it when closed. In a further variation, instead of being fixed to door 110 or to the side wall of the dishwasher, rinse-aid closure cap 115 could instead be replaced by a removable push-in or screw-in cap or bung for sealing rinse-aid refill port 112.

As stated, a drawer-type dishwasher is referred to by way of example only, and the dishwasher may instead be of the front drop-door type or in-sink type, for example.

The door 110 carries the detergent bucket 113 and rinse-aid refill port 112 but in another embodiment may carry a detergent refill port in place of the detergent bucket. The detergent refill port 112 may be coupled to an internal detergent reservoir by a flexible conduit similar to conduit 122 described above between the rinse-aid refill port on the door and the rinse-aid reservoir 120.

Alternatively again, door 110 may only carry a detergent refill port, not also a rinse-aid refill port, with the detergent refill port coupled to an internal detergent reservoir by a flexible conduit similar to conduit 122 described above between the rinse-aid refill port on the door and the rinse-aid reservoir 120.

Additional to carrying a detergent bucket or enabling access to a detergent bucket or refill port, and carrying a rinse-aid refill port; or carrying a detergent refill port alone; the door may also carry a port enabling refill of a water softener and/or salt reservoir, with the water softener and/or salt refill port coupled to an opening of an internal brine reservoir by a flexible conduit similar to conduit 122 described above between the rinse-aid refill port on the door and the rinse-aid reservoir 120. Or alternatively again, the door may carry only a water softener and/or salt refill port, not also a detergent bucket and/or rinse-aid refill port, with the water softener and/or salt refill port refill port coupled to an internal brine reservoir by a flexible conduit.

Rinse-Aid Dispenser Mini-Pipe for Air Evacuation and Metered Volume Control

Figure 14:
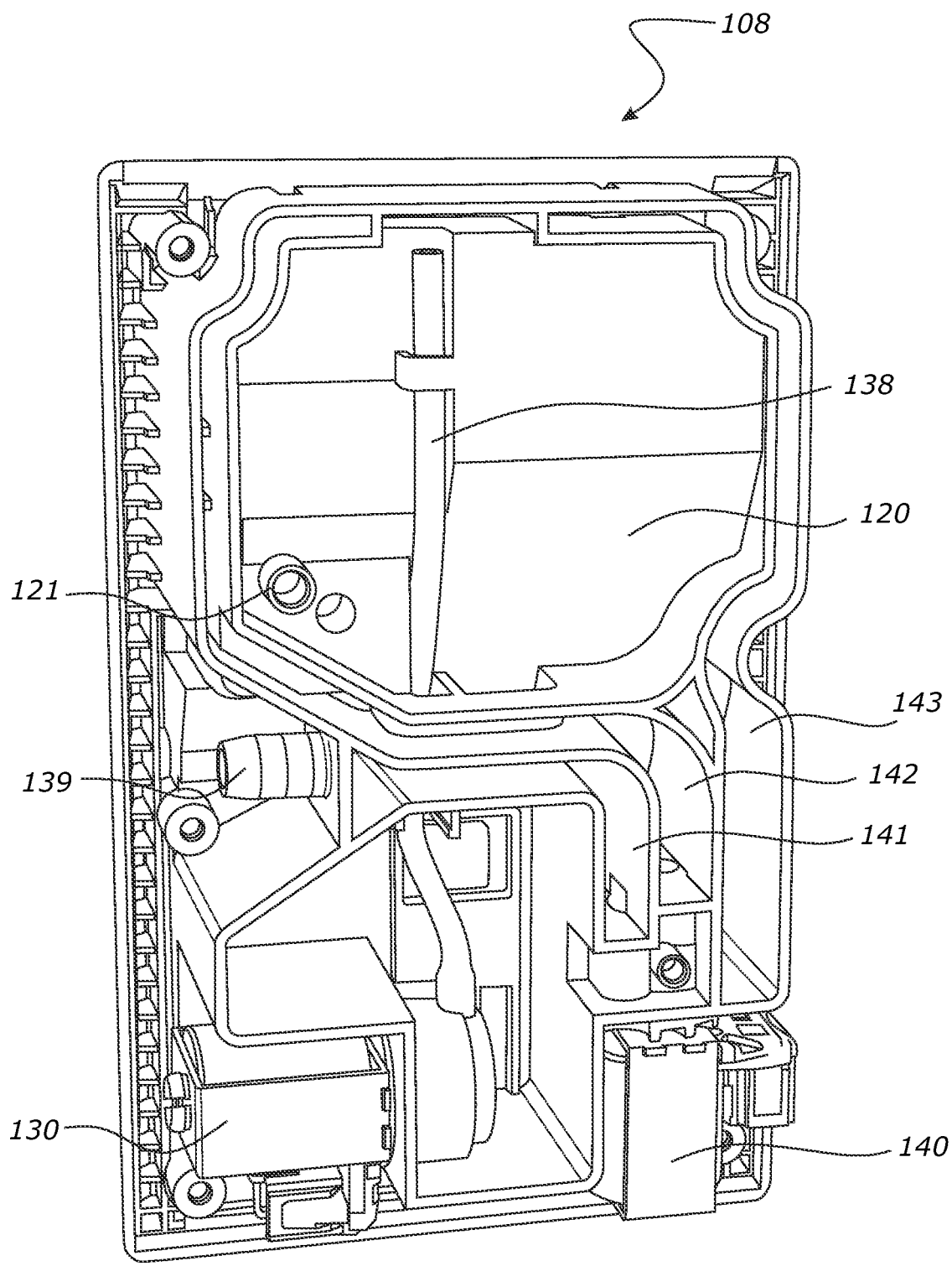
FIG. 14 is a perspective view of the rear side (that is, from the front of the dishwasher) of the detergent and rinse-aid module of FIGS. 4 to 13 with a rear wall component removed.

FIG. 14 is a perspective view of the rear side of the detergent and rinse-aid module 108 of FIGS. 4 to 13 with a rear wall component removed. FIG. 7 is a similar view which includes the rear wall component which is preferably plastics welded to the rear of the module. Module 108 comprises rinse-aid reservoir 120 with rinse-aid reservoir entry port 121 to which flexible conduit 122 couples on its front side, and rinse-aid dispenser valve 130.

It can be seen that the rear side of detergent and rinse-aid module 108 includes a water inlet 139 via which the dispenser, and therefore the wash tub, receives a supply of fresh water from the wash water inlet valve (not shown). Optionally, the fresh water supply may first be passed through a water softener as is well known. A first flow passage 141 is formed in module 108 to channel wash water from inlet 139 to a diverter valve 140. Because of the relative locations of inlet 139 and diverter valve 140 relative to reservoir 120, this first passage 141 passes over/across/behind/through reservoir 120. Diverter valve 140 may be solenoid-controlled and, when opened, allows wash water to flow from first flow passage 141 into two further passages 142 and 143 simultaneously.

Passage 142 channels wash water initially upwardly and then back across reservoir 120 before again channeling wash water upwardly to eventually exit the passage in a downward direction. Wash water exits passage 142 within the cavity in the front side of module 108, which cavity contains the detergent bucket 113 and rinse-aid refill port 112 when door 110 is closed (see FIG. 11). Thus, wash water from passage 142 enters the cavity at or near its upper side, above rinse-aid closure cap 115 and washes the closure cap as well as the internal surfaces of the cavity before exiting module 108 at the lower edge of door 110 and entering the dishwasher wash space.

Passage 143 channels wash water generally upwardly to eventually exit the passage within the cavity on the front side of module 108 at or above detergent bucket 113 to flush detergent from the bucket (as is further explained below), into the cavity, and from there into the dishwasher's wash space.

Although passages 141 and 142 pass across, or traverse, reservoir 120, dividing it into upper and lower regions, those regions of reservoir 120 are connected together by a substantially vertically-aligned channel behind (as viewed in FIG. 14) passages 141 and 142. However, passages 141 and 142 create a constriction between the upper and lower regions of reservoir 120, reducing the ability of air bubbles, trapped in the lower part of the reservoir, to rise to the surface of the rinse-aid in the reservoir. It is beneficial that such air bubbles be efficiently removed from the lower region of the reservoir as their presence could have a detrimental effect on the ability of rinse-aid pump 130 to prime and to accurately dispense metered doses of rinse-aid.

Although not shown in the drawing figures, covers may be provided above valves 130, 140 to shield them and their electrical connections from the possibility of water dripping/leaking onto them from the reservoir and water channels above them.

Figure 15:
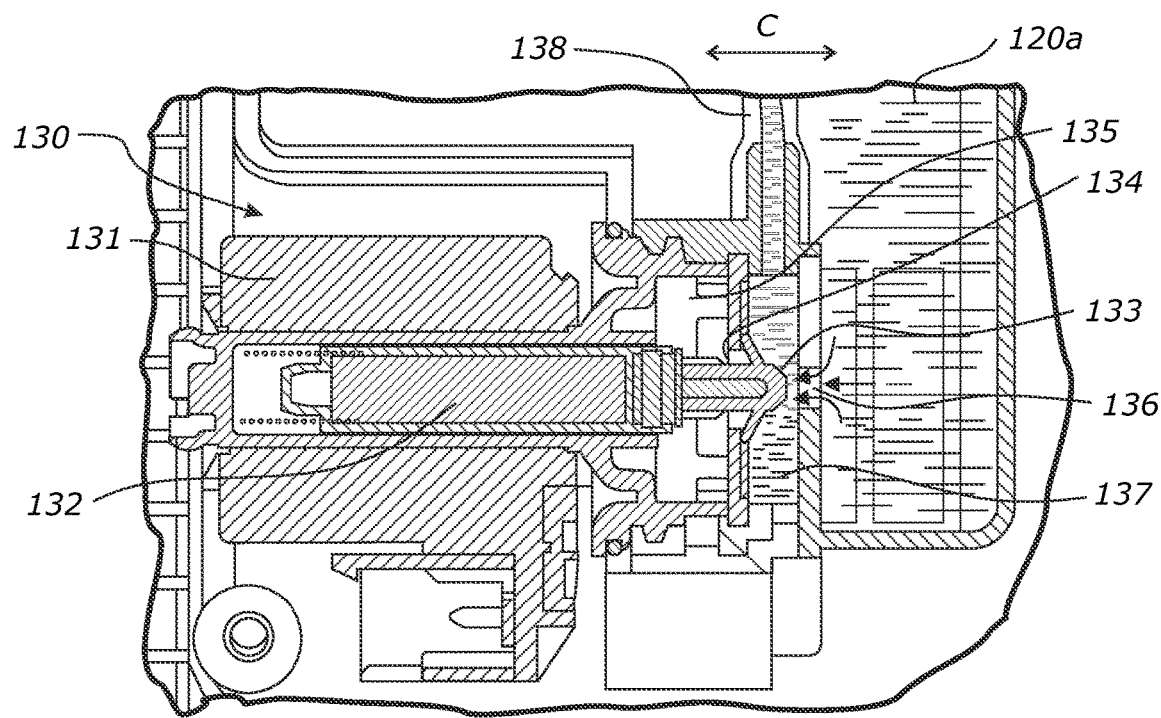
FIGS. 15 and 16 are schematic cross-sectional views of the rinse-aid dispenser valve and part of a rinse-aid module around the rinse-aid dispenser valve shown in FIG. 14, FIGS. 17A and 17B are similar cross-section views through a water channel leading, respectively, to a prior art and an improved spray- or jet-forming hood above a detergent bucket.
Figure 16:
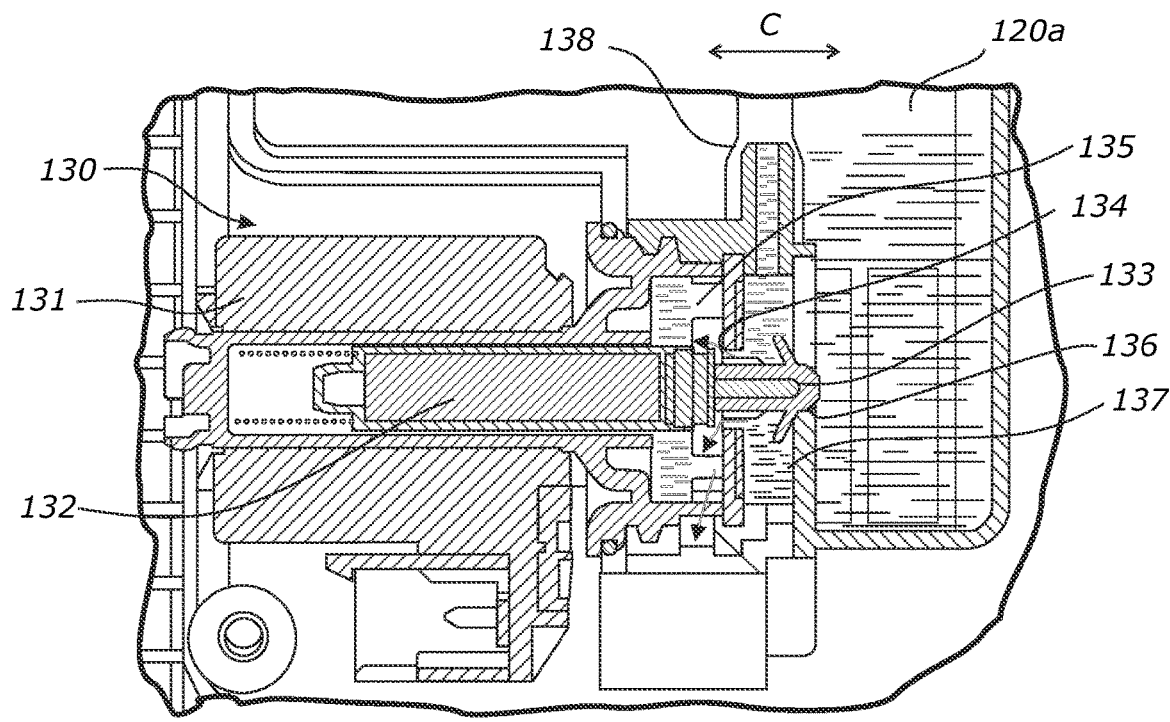

FIGS. 15 and 16 are schematic cross-sectional views of the rinse-aid dispenser valve 130 and part of the detergent and rinse-aid module 108 around the rinse-aid dispenser valve 130. In an embodiment, the rinse-aid dispenser valve 130 is solenoid-operated, and comprises solenoid 131 and armature 132 which moves laterally in operation as indicated by arrow C in FIGS. 15 and 16, to dispense a metered amount of rinse-aid liquid from rinse-aid reservoir 120 into a channel or passage within detergent and rinse-aid module 108 from which it may emerge into the wash space (for example, rinse-aid may be dispensed via a gap or opening or slot along the bottom edge of door 110 where the door, in its closed position, does not abut the lower panel of module 108—see FIG. 10B). The armature 132 carries a resilient seal cap 133.

In a normal position that can also be referred to as a priming position, armature 132 is in the position shown in FIG. 15, where the seal cap 133 closes port 134 to a chamber 135. In this position of the armature 132 and seal cap 133 a port 136 from the lower region 120a of the rinse-aid reservoir 120 allows a predetermined volume of rinse-aid to fill a metering chamber 137. As it does so, any air pockets/bubbles entering metering chamber 137 may exit through an upwardly-directed tube or pipe 138 connected to an upper region of metering chamber 137 to the upper region of the rinse-aid reservoir 120. Pipe 138 passes through the channel connecting the upper and lower regions of the reservoir and its top end opens into the upper region of the rinse-aid reservoir 120. The upper part of the upper region of rinse-aid reservoir 120 is filled with air, rather than rinse-aid, as it extends vertically above the level of rinse-aid refill port 112. The upper end of pipe 138 (which may, for example, be formed of a flexible elastomeric rubber material) is also arranged vertically above the level of rinse-aid refill port 112 so that it is above the maximum level of rinse-aid in reservoir 120 making it impossible for rinse-aid in the reservoir to leak into pipe 138 via its upper end. As rinse-aid fills the metering chamber it also fills pipe 138 up to the level of rinse-aid in reservoir 120.

Subsequently when rinse-aid is to be dispensed into chamber 135 from metering chamber 137, armature 132 is moved under control of the machine controller, to the position shown in FIG. 16. In this position the seal cap 133 now opens port 134 to chamber 135, enabling the measured quantity of rinse-aid in chamber 137 as well as the quantity of rinse-aid in pipe 138 to enter chamber 135 and from there to drain into the wash space where it mixes with rinse water. In this position of armature 132, rinse-aid in reservoir 120 cannot flow through port 136 into metering chamber 137 and pipe 138 until the armature 132 and seal 133 move back to the priming position.

Detergent Flushing Jet

Optionally, dishwasher 100 may include or comprise an improved configuration for water flushing of detergent (usually powdered detergent) from a detergent compartment such as detergent bucket 113 on the rear of detergent (and rinse-aid refill) door 110. In operation, during the wash cycle of a dishwasher (preferably at the start of the wash cycle, or following a pre-wash rinse), water is directed from a nozzle or orifice above the detergent bucket into the detergent bucket as a jet or spray. The orifice may be connected to water passage 143 (FIG. 14) and the jet or spray flushes detergent from the detergent bucket into the cavity of module 108 and from there into the dishwasher's wash space.

In an embodiment, the orifice is shaped to deliver the water jet or spray in a "fan", or substantially flat triangular shape, as fully explained below. In contrast, we have tested detergent flushing arrangements having an orifice that is shaped as a thin straight slit which generates a "blade" shaped water jet which has a flat cross-sectional shape (cut in a plane substantially perpendicular to the flow direction), the cross-section being substantially rectangular with a height of only a few mm and a perpendicular width of, for example, 1-2 cm. The detergent container preferably has an opening width of at least double the width of such a "blade" jet which results in the inefficient flushing of detergent from the container, often with detergent remaining in the container at the conclusion of a flushing operation. Extending the length of a flushing cycle could mitigate this problem but it is desirable to use the minimum possible quantity of water to flush the detergent drawer, and subsequently wash the load, to maximise water efficiency of the dishwasher.

Accordingly, forming the water jet or spray into a "fan" or flat, triangular shape which has a similar rectangular cross-sectional shape in a plane perpendicular to the flow direction but wherein the width of the spray pattern increases with distance from the orifice has been found to provide better detergent flushing performance. It has been found that generating the "fan"-shaped spray pattern to flush the detergent dispenser bucket is much less likely to result in some detergent remaining in the detergent compartment following a flushing operation. In an alternative embodiment, the fan-shaped jet or spray could be curved rather than straight/flat when cut in a plane substantially perpendicular to the flow direction. In other words, the spray or jet pattern could be a partial surface of a cone with the cone's apex located at the spray nozzle or orifice.

FIG. 17A is a cross-sectional view through an upper part of the detergent and rinse-aid module 108, including water channel 143 leading to a "blade"-shaped spray or jet-forming hood above detergent bucket 113 as described previously. FIG. 17B is a similar cross-section view but with water channel 143 leading to a similar but improved "fan"-shaped spray- or jet-forming hood above the detergent bucket. FIG. 18A is a view into the "blade"-shaped spray or jet-forming hood of FIG. 17A from below and slightly rear of the bucket (that is, towards the rear of the dishwasher), and FIG. 18B is a view into the improved "fan"-shaped spray or jet-forming hood of FIG. 17B from below and slightly rear of the bucket. Finally, FIG. 19A is a view into the "blade"-spray or jet-forming hood of FIGS. 17A and 18A from the front of module 108 (that is, looking towards the inner front surface of the drawer) with the detergent and rinse-aid refill door 110 open/removed showing the "blade"-shaped spray or jet which is formed when water is flowing, and FIG. 18B is a similar view into the improved spray or jet-forming hood of FIGS. 17B and 18B showing the "fan"-shaped spray or jet which is formed thereby.

In the configuration of FIGS. 17A and 18A, pressurised water flows during the wash cycle, through internal channel 143 into the upper part of an approximately (in lateral cross-section—perpendicular to the front-rear axis of the dishwasher) triangular- or trapezoidal-shaped space 202 which extends laterally over/above detergent bucket 113, and which is defined within a hood 203. Water under pressure enters the hood 203 from channel 143 via a straight slit-shaped orifice and spreads to a "blade"-shaped spray pattern extending laterally over detergent bucket 113 as shown in FIG. 19A and indicated at 204, flushing detergent from the bucket and into the wash space.

In the configuration of FIGS. 17B and 18B, pressurised water again flows during the wash cycle, through channel 143 into the upper part of an approximately triangular- or trapezoidal-shaped space 202*a* which extends laterally over detergent bucket 113, and which is defined within a hood 203*a*. The space 202*a* within hood 203*a* is deeper in a vertical height dimension than it is in a front-rear dimension of the detergent bucket 113, i.e., deeper in the direction of water flow.

Water under pressure enters hood 203*a* from channel 143 via a substantially circular opening or orifice or nozzle and spreads to a "fan"-shaped spray pattern extending laterally over detergent bucket 113 as shown in FIG. 19B and indicated at 204*a*, flushing detergent from the bucket and into the wash space. It can be seen in FIG. 18B that orifice 205 is located in one of the laterally-extending walls of hood 203*a*, more specifically, the laterally-extending wall that is nearest the front of the dishwasher. Water exiting orifice 205 crosses hood 203*a* and impacts the opposite laterally-extending hood wall 206 which is downwardly curved as shown in FIG. 17B. Impact with the hood wall spreads the flow laterally and directs the flow downwardly to generate the aforementioned "fan"-shape indicated at 204*a*. The upper extent of opening 205 may correspond with the start of the curved surface 206 with the jet flowing smoothly onto the surface. Alternatively, there may be a step from the upper extent of opening 205, upwardly, to the start of the curved surface 206 so that the jet of water exiting the orifice impinges surface 206 after crossing a small gap from the nozzle opening 205 to the surface.

By "fan"-shaped' it is meant that the water spray or jet spreads laterally over the detergent bucket 113 and extends deeper in the front-rear axis of the dishwasher, approximately perpendicular to the lateral dimension of the detergent bucket 113. As a result the "fan"-shaped water jet or spray covers a greater area of the interior of the detergent bucket and is directed downwardly and towards a central part of the forward, laterally-extending wall of bucket 113 resulting in water flow within the detergent bucket mixing with the detergent to create a slurry. Water initially flows downwardly through the detergent before rebounding off the forward wall of the bucket, spreading laterally and then rebounding off the base of the bucket. The flow is then re-directed thereby, upwardly and towards the rearward, laterally-extending bucket wall. As the water flow surges and rebounds around the bucket it picks up, and at least partially dissolves, detergent until the slurry overflows an upper lip or rim of the bucket at the top of the rearward bucket wall. From the cavity, the detergent slurry enters the dishwasher wash space via, for example, a gap at the lower edge of door 110. Thus, the "fan"-shaped water jet or spray is more effective at flushing detergent from the bucket.

When lower front panel 125 of module 108 is provided by a removable, cosmetic panel there is a risk that soil may become trapped in the enclosed space between the panel and the surfaces of the module that it is covering. Because the panel is removable, a user may occasionally remove it and wash behind the panel.

Alternatively, module 108 may be provided with a cleaning jet which provides water to the space between the panel and the adjacent surfaces of the module. Such a cleaning jet could be provided by an opening or orifice (not shown) formed in water channel 142 which opens into the space behind the panel. In this way, whenever fill water is added to the dishwasher (via the dispenser), a diversion of the flow will also jet water to the space behind the panel, flushing/cleaning the space. Water within the space flows back into the dishwasher tub via internal clearances or gaps between panel 125 and frame 109.

SUMMARY STATEMENTS OF POTENTIAL ADDITIONAL INVENTIONS

Clause 1: A dishwasher, or an additive dispensing module for a dishwasher, comprising:
a rinse-aid dispenser,
a rinse-aid reservoir above the rinse-aid dispenser, and
a conduit from or associated with a rinse-aid dispenser below the rinse-aid reservoir to an upper part of the rinse-aid reservoir enabling air to evacuate to an upper part of the rinse-aid reservoir.

Clause 2: The dishwasher according to clause 1, wherein the rinse-aid dispenser comprises a rinse-aid metering chamber and wherein the conduit from or associated with a rinse-aid dispenser is from the metering chamber to an upper part of the rinse-aid reservoir, enabling air to evacuate from the metering chamber to an upper part of the rinse-aid reservoir when rinse-aid is priming from the rinse-aid reservoir into the metering chamber.

Clause 3: The dishwasher according to any one of the preceding clauses or any of the claims, comprising a detergent bucket and an outlet adjacent the detergent bucket arranged to deliver detergent-flushing water under pressure into the detergent bucket as a fan-shaped jet or spray.

Clause: 4. A dishwasher comprising:
a detergent bucket, and
an outlet adjacent the detergent bucket arranged to deliver detergent-flushing water under pressure into the detergent bucket as a fan shaped jet or spray.

Clause 5: The dishwasher according to either clause 3 or clause 4, wherein the outlet opens into a spray-or jet-forming hood above the detergent bucket.

Clause 6: The dishwasher according to clause 5, wherein the spray- or jet-forming hood includes a downwardly-curved wall onto which the outlet opens.

Clause 7: A dishwasher comprising:
an additive reservoir, and
a door associated with a refill port to the additive reservoir,
wherein the door carries a detergent bucket, either as the additive reservoir, or as an additional additive reservoir.

Clause 8: The dishwasher according to clause 7, wherein the refill port is carried by the door.

Clause 9: The dishwasher according to clause 7 or clause 8, wherein the detergent bucket and a separate refill port to the additive reservoir are both provided on a rear side of the door.

Clause 10: A dishwasher comprising:
an additive reservoir, and
a door associated with a refill port to the additive reservoir,
wherein the door carries a closure cap to the refill port and wherein closing of the door also closes the closure cap to the refill port.

Clause 11: The dishwasher according to clause 10, wherein the door is a pivotally-mounted door and the closure cap to the refill port is pivotally-mounted to the door.

Clause 12. The dishwasher according to either clause 10 or clause 11, comprising a first closure for holding said door closed and a second, separate closure, for holding closed the closure cap to the refill port.

The foregoing describes the invention including preferred forms thereof and alterations and modifications as will be obvious to one skilled in the art are intended to be incorporated within the scope hereof.

The invention claimed is:

1. A dishwasher comprising:
an additive reservoir,
a pivotally-mounted door associated with a refill port to the additive reservoir, and
a flexible conduit between the refill port and the additive, reservoir through which additive may be supplied to the additive reservoir,
wherein a closure cap for the refill port is carried by and pivotally-mounted to, the door.

2. The dishwasher according to claim 1, wherein the flexible conduit is a resiliently-compressible conduit.

3. The dishwasher according to claim 1, wherein at least a part of the flexible conduit comprises a concertina structure.

4. The dishwasher according to claim 1, wherein closing of the door is against resilience of the flexible conduit, which biases the door open.

5. The dishwasher according to claim 1, wherein closing of the door also closes the closure cap to the refill port.

6. The dishwasher according to claim 1, wherein the additive reservoir is a rinse-aid reservoir and the door associated with a refill port to the rinse-aid reservoir is also associated with a detergent compartment of the dishwasher.

7. The dishwasher according to claim 1, wherein the door carries a detergent bucket, either as the additive reservoir, or as an additional additive reservoir.

8. The dishwasher according to claim 7, wherein the detergent bucket and a separate refill port to the additive reservoir are both provided on a rear side of the door.

9. The dishwasher according to claim 1, wherein the door is provided in or attached to an inside wall of the dishwasher.

10. The dishwasher according to claim 9, wherein the door is pivotally mounted in or to the inside wall of the dishwasher.

11. The dishwasher according to claim 1, wherein the door is provided in or on a front inside wall of a drawer-type dishwasher, or in or on an inside wall of a main door of a front, drop-door-type dishwasher, or in or on an inside wall of a tub or on a lid of an in-sink-type dishwasher.

12. The dishwasher according to claim 1, wherein the door and additive reservoir comprise part of a separate detergent and rinse-aid module mounted in or to an inside wall, or a main door, of the dishwasher.

13. The dishwasher according to claim 1, further comprising a conduit from or associated with an additive dispenser, to an upper part of the additive reservoir enabling air to evacuate to an upper part of the additive reservoir.

14. The dishwasher according to claim 1, wherein closing of the door also latches closed the closure cap to the refill port.

15. A dishwasher comprising:
a detergent compartment,
a door to the detergent compartment,
a rinse-aid reservoir,
a refill port to the rinse-aid reservoir, the refill port carried by the door to the detergent compartment,
a closure cap to the refill port to the rinse-aid reservoir, the rinse-aid closure cap associated with the door to the detergent compartment, and
a resiliently flexible and/or compressible conduit between the rinse-aid refill port and the rinse-aid reservoir.

16. The dishwasher according to claim 15, wherein the closure cap to the refill port to the rinse-aid reservoir is mounted on the door to the detergent compartment.

17. The dishwasher according to claim 15, wherein closing of the door is against resilience of the conduit, which biases the door open.

18. The dishwasher according to claim 15, wherein the door is provided in the front inside wall of a drawer-type dishwasher or the inside wall of the main door of a front drop-door-type dishwasher.

19. The dishwasher according to claim 15, further comprising a conduit from or associated with a rinse-aid dispenser, to an upper part of the rinse-aid reservoir enabling air to evacuate to an upper part of the rinse-aid reservoir.

20. A dishwasher comprising:
an additive reservoir,
a door associated with a refill port to the additive reservoir,
a flexible conduit between the refill port and the additive reservoir through which additive may be supplied to the additive reservoir an additive metering chamber, and
a conduit from the metering chamber to an upper part of the additive reservoir enabling air to evacuate from the metering chamber to an upper part of the additive reservoir when additive is priming from the additive reservoir into the metering chamber.

21. The dishwasher according to claim 20, wherein the conduit enables air to evacuate from the metering chamber to an upper part of the additive reservoir when additive is priming from the additive reservoir into the metering chamber and the conduit.

* * * * *